G. T. RIX.
MILK BOTTLE CARRIER.
APPLICATION FILED DEC. 17, 1919.

1,336,049.

Patented Apr. 6, 1920.

G. T. Rix
Inventor,

Witness

UNITED STATES PATENT OFFICE.

GEORGE T. RIX, OF DENVER, COLORADO.

MILK-BOTTLE CARRIER.

1,336,049.  Specification of Letters Patent.  Patented Apr. 6, 1920.

Application filed December 17, 1919. Serial No. 345,449.

*To all whom it may concern:*

Be it known that I, GEORGE T. RIX, a citizen of the United States, residing at Denver, in the county of Denver and State of Colorado, have invented a new and useful Milk-Bottle Carrier, of which the following is a specification.

This invention relates to new and useful improvements in article carriers, and more particularly to devices especially adapted for carrying milk bottles.

The primary object of the invention is to provide the milk bottle carriers including a handle which may be readily and easily attached and detached from a milk bottle, and one which will firmly grip the neck of the milk bottle to which the same has been applied, thus rendering a milk bottle more conveniently carried.

A further object of the invention is to provide a device of this character including a bottle engaging portion and a handle, means for connecting the handle and bottle engaging portion, whereby the bottle engaging portion will be locked to the handle upon movement of the handle to its carrying position.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1:
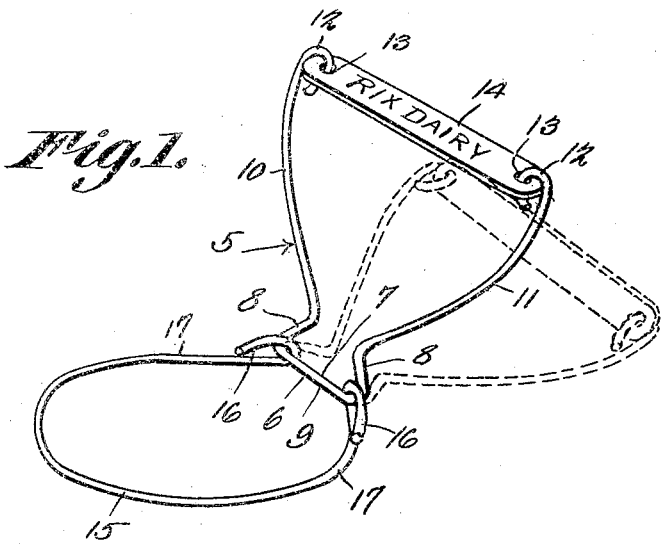
Figure 1 illustrates a perspective view of a carrier, constructed in accordance with the present invention.

Referring to the drawing in detail, the reference character 5 designates the handle portion of the carrier, and the same includes a length of wire bent intermediate its length as at 6 to provide the recessed portion 7 having inclined arms 8 extending from the relatively straight portions 9, the arms 10 and 11 forming continuations of the arms 8, extend upwardly and are bent upon themselves to provide the hook portions 12 which pass through the openings 13 formed adjacent the respective ends of the hand engaging portion 14 of the carrier.

The carrier also includes a bottle engaging section comprising the jaw 15 which is also formed of a length of wire having certain flexible qualities to permit the same to expand and contract, to increase or diminish the diameter of the jaw 15 to accomplish the locking result.

This jaw 15 is provided with loop portions 16 formed integral with the respective ends thereof, the loop portions 16 being of a size to embrace the handle section of the carrier whereby the jaw 15 is secured to the handle section 5.

From the foregoing it will be seen that when the jaw 15 is in the position as illustrated by Fig. 1 of the drawing, and the handle portion thereof is in a position as indicated by full lines in Fig. 1 of the drawing, the loop portions 16 are locked within the recessed portions of the handle section so that it would be impossible to move the loop sections along the handle section to cause the opening of the jaw 15, to release the bottle associated therewith.

Figure 3:
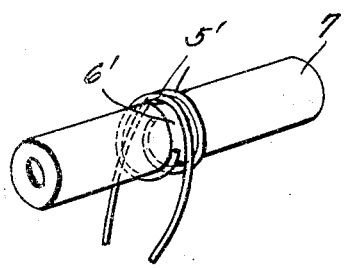
Fig. 3 illustrates a modified form of handle.

In the modified form of the invention as illustrated by Fig. 3 of the drawing, the handle is shown as having its ends bent to provide loops 5′, which loops are disposed within the grooves 6′ formed intermediate the length of the handle 7′, thus producing a handle extending at right angles to the handle section, of the carrier.

Figure 2:
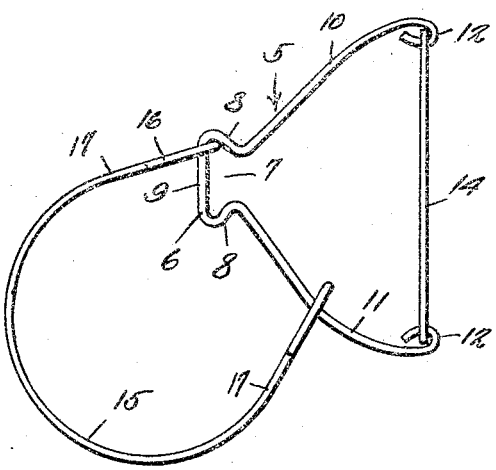
Fig. 2 illustrates an elevational view of the same showing the jaw in an expanded position.

In the operation of the device, assuming that the device is to be placed over the neck of a bottle, the jaw section 15 is moved to a position as indicated in full lines in Fig. 2 of the drawing, whereupon the arms 17 forming a part of the jaw 15, move away from each other to increase the size of the jaw 15 to permit the jaw to be positioned over the usual flanged mouth of a milk bottle.

The handle section is now moved to a position as indicated in full lines in Fig. 1 of the drawing, whereupon the loop portion 16 of the jaw 15 assumes a position within the recessed portion of the handle section, thus causing the arm 17 of the jaw 15 to embrace the bottle to permit the same to be carried by the handle 14.

Having thus described the invention, what is claimed is:—

1. An article carrier comprising a handle section and a jaw section, said jaw section including a length of resilient wire, having loops formed at its ends, said handle section having an offset portion, said loops embracing the handle section at a point within the offset portion thereof, said offset portion being constructed to lock the loops to the handle section.

2. An article carrier comprising a handle section and a jaw section, said jaw section including a length of wire curved to conform to the contour of a bottle neck, said jaw section having loops formed at its ends, said handle section having an offset portion accommodating the loops, for locking the jaw section in a carrying position, and a handle forming a part of the handle section.

3. An article carrier comprising a handle section and a jaw section, said jaw section having loops formed at the ends thereof, said handle section having an offset portion, inclined arms forming a part of the offset portion, said loops adapted to embrace the handle section, and portions of the jaw section adapted to engage under the inclined arms of the offset portion for locking the jaw section to the handle section.

4. An article carrier including a handle section and a jaw section, said jaw section including a length of resilient wire, including arms curved to conform to the contour of a bottle neck, said handle section having an offset portion, the ends of said arms being bent upon themselves to provide loop portions, said loop portions adapted to embrace the handle sections at a point within the offset portion of the handle section, and a handle forming a part of the handle section.

In testimony that I claim the foregoing as my own, I have hereto affixed my signature in the presence of two witnesses.

GEORGE T. RIX.

Witnesses:
A. S. LONG,
Mrs. GEO. T. RIX.